(12) United States Patent
Tokie

(10) Patent No.: US 6,513,897 B2
(45) Date of Patent: Feb. 4, 2003

(54) MULTIPLE RESOLUTION FLUID APPLICATOR AND METHOD

(75) Inventor: Jeffrey H. Tokie, Scandia, MN (US)

(73) Assignee: 3M Innovative Properties Co., St. Paul, MN (US)

(*) Notice: Subject to any disclaimer, the term of this patent is extended or adjusted under 35 U.S.C. 154(b) by 0 days.

(21) Appl. No.: 09/751,142

(22) Filed: Dec. 29, 2000

(65) Prior Publication Data

US 2002/0085054 A1 Jul. 4, 2002

(51) Int. Cl.$^7$ .............................. B41J 2/205; B41J 3/00

(52) U.S. Cl. ............................................. 347/15; 347/2

(58) Field of Search ................................ 347/2, 43, 16, 347/85, 86

(56) References Cited

U.S. PATENT DOCUMENTS

| | | | |
|---|---|---|---|
| 3,606,162 A | | 9/1971 | Lehmann |
| 4,181,752 A | | 1/1980 | Martens et al. |
| 4,587,152 A | | 5/1986 | Gleichenhagen et al. |
| 4,967,933 A | | 11/1990 | Maiorca et al. |
| 4,978,969 A | | 12/1990 | Chieng |
| 5,057,852 A | * | 10/1991 | Formica et al. ............ 347/43 |
| 5,081,596 A | * | 1/1992 | Vincent et al. ............ 358/1.4 |
| 5,194,299 A | | 3/1993 | Fry |
| 5,200,152 A | | 4/1993 | Brown |
| 5,217,745 A | | 6/1993 | Patel |
| 5,275,646 A | | 1/1994 | Marshall et al. |
| 5,294,459 A | | 3/1994 | Hogan et al. |
| 5,329,293 A | | 7/1994 | Liker |
| 5,421,941 A | | 6/1995 | Allen et al. |
| 5,423,935 A | | 6/1995 | Benecke et al. |

(List continued on next page.)

FOREIGN PATENT DOCUMENTS

| | | | |
|---|---|---|---|
| EP | 0 276 557 | 4/1992 | |
| EP | 0 500 225 | 8/1992 | |
| JP | 06-155770 A | * 6/1994 | .............. 347/43 |
| JP | 10-184435 | 1/2000 | |
| WO | 89/07878 | 8/1989 | |
| WO | 92/15651 | 9/1992 | |
| WO | 95/15266 | 6/1995 | |
| WO | 96/14212 | 5/1996 | |
| WO | 99/06888 | 2/1999 | |
| WO | 99/11727 | 3/1999 | |
| WO | 99/19900 | 4/1999 | |
| WO | WO 99/29436 | 6/1999 | |
| WO | 00/10933 | 3/2000 | |

OTHER PUBLICATIONS

Advancements in Jetting Adhesives and Conductive Materials for Electronic Assembly Applications, by Michael A. Reighard, Nordson Corporation, pp. 305–315, vol. 1, 1998.

(List continued on next page.)

*Primary Examiner*—Thinh Nguyen
(74) *Attorney, Agent, or Firm*—Scott R. Pribnow

(57) ABSTRACT

A fluid applicator capable of both high resolution and high throughput fluid deposition includes a fluid dispensing system for dispensing fluid material, a substrate handling system for positioning a substrate with respect to the fluid dispensing system and a control system for controlling the dispensing and positioning functions. The fluid dispensing system includes a plurality of fluid dispensing mechanisms that dispense fluid material at a plurality of resolutions and a plurality of throughputs while using different fluid dispensing technologies. The fluid dispensing mechanisms preferably include an ink jet print head, a stream jet and/or a spray jet, each capable of different resolutions and throughputs, such that the ink jet lays down a precise border pattern with the stream jet and spray jet providing faster surface area coverage and higher volume deposition within the border. The fluid materials being deposited preferably include jettable adhesives, along with other jettable materials.

49 Claims, 6 Drawing Sheets

U.S. PATENT DOCUMENTS

| | | | |
|---|---|---|---|
| 5,439,515 | A | 8/1995 | Kurabayashi et al. |
| 5,487,929 | A | 1/1996 | Rusincovitch, Jr. et al. |
| 5,498,444 | A | 3/1996 | Hayes |
| 5,505,777 | A | 4/1996 | Ciardella et al. |
| 5,506,607 | A | 4/1996 | Sanders, Jr. et al. |
| 5,511,477 | A | 4/1996 | Adler et al. |
| 5,568,173 | A | 10/1996 | Leenders et al. |
| 5,635,969 | A | 6/1997 | Allen |
| 5,683,752 | A | 11/1997 | Popp et al. |
| 5,707,684 | A | 1/1998 | Hayes et al. |
| 5,711,989 | A | 1/1998 | Ciardella et al. |
| 5,729,963 | A | 3/1998 | Bird |
| 5,734,390 | A * | 3/1998 | Sakaizawa et al. ............ 347/2 |
| 5,740,051 | A | 4/1998 | Sanders, Jr. et al. |
| 5,747,102 | A | 5/1998 | Smith et al. |
| 5,757,407 | A * | 5/1998 | Rezanka .................... 347/102 |
| 5,764,254 | A | 6/1998 | Nicoloff, Jr. et al. |
| 5,924,794 | A | 7/1999 | O'Dougherty et al. |
| 5,958,512 | A | 9/1999 | Krish et al. |
| 6,013,347 | A | 1/2000 | Martin et al. |
| 6,126,259 | A | 10/2000 | Stango et al. |
| 6,162,378 | A | 12/2000 | Bedal et al. |

OTHER PUBLICATIONS

Naucler, Don, "Dispense Technology Progresses with Advanced Packaging," *Advanced Packaging*, pp. 48–51, Nov., Dec. 1999.

"Adhesive Deposition" by Rich Lieske and William Coleman, *SMT*, pp. 70–76, Jan. 2000.

Whitmore, Mark, *Advanced Packaging*, "Adhesive Dispensing: Evolving in a New Direction," pp. 16 and 18, Jan. 2000.

Holloway, Michael, *Society of Manufacturing Engineers, Technical Paper*, Multi–Tasking and the Emergence of the Adhesive Dispensing Work–Cell Concept, 1999.

*Robotics World*, "Not Too Hot, Not Too Cold," by M. Bonner, pp. 38–41, May/Jun. 2000.

*Advanced Packaging*, "Ultra High–Speed Dispensing," by Lee, C., pp. 37–41, Aug. 2000.

"Micro–Adhesion (Part 1)—Dosing Very Small Amounts of UV–Curable Acrylates by Andreas Hartwig," *Adhesion: "Kleben & Dichten,"* 43, 37–42, pp. 1–10, 1999.

Journal of Electronics Manufacturing entitled "Micro–Jet Printing of Polymers and Solder for Electronics Manufacturing," by Donald J. Hayes, W. Royall Cox, and Michael E. Grove, pp. 209–216, vol. 8, No. 3 & 4, Sep. & Dec., 1998.

"Printing Polymer Solders," by Steve Corbett and Martin J. Domiano, pp. 635–646, 1997.

Plastics Technology, by Joseph Ogando, pp. 34–36, Jul. 1999.

Issues for the Practical Production Use of Dispensing Technologies, by Frank Murch, Douglass Dixon, Maurice Davis III, pp. 245–256, vol. 1, 1997.

Dispensing High Speed SMD Adhesives, Important Parameters and Process Implementation, by Mark J. Norris, pp. 267–274, 1997.

Screen Printing Bottom Side Chip Attach Adhesive by Rich Lieske and K. Quigley, vol. 1, pp. 167–177, 1997.

* cited by examiner

MULTIPLE RESOLUTION FLUID APPLICATOR AND METHOD

FIELD OF THE INVENTION

This invention relates to fluid applicators that have multiple resolution capability, in particular to fluid applicators including ink jet print heads in combination with one or more other types of fluid dispensing mechanisms having various resolution and flow rate characteristics.

BACKGROUND OF THE INVENTION

Various types of fluid applicators for dispensing a fluid, such as ink, adhesives, release materials, polymer based materials or other fluid materials, are currently available and usable for widely varying purposes. These applicators have utilized both contact and non-contact type techniques to apply a fluid to a substrate. In the printing area, these different techniques include contact methods such as flexographic printing and screen printing. In other fluid application areas, surface mount technology and robotics have been used to apply fluid in highly controlled and specific patterns. In recent years, major developments in the printing field have produced faster, better, cheaper and more user friendly printing devices for use with computer systems. The former mainstays of the computer printing area, dot-matrix printers and plotters, have given way to affordable personal laser printers and ink jet devices.

Ink jet imaging techniques have become very popular not only in devices for printing text, graphics and other images on flat sheet material, such as paper or film, but also in other commercial and consumer applications. Ink jet printers use a non-contact technique and operate by ejecting a fluid onto a receiving substrate in controlled patterns of fluid droplets. By selectively regulating the pattern of fluid droplets, ink jet printers can produce a wide variety of high resolution printed features, including text, graphics, images and holograms, using a wide variety of fluid materials, including various inks, adhesives and the like. Moreover, ink jet printers are capable of forming printed features on a wide variety of substrates, including not just flat films or sheets, but also three-dimensional objects as well.

Thermal ink jet printers and piezo ink jet printers are the two main types of inkjet systems in widespread use today. For both approaches, the fluid materials must meet stringent fluidic property requirements in order for the fluids to be appropriately jettable and for the resultant printed features to have the desired characteristics, such as mechanical, chemical, visual, and durability characteristics. In particular, the fluids must have relatively low viscosity when jetted, yet must be able to form accurate, durable images on the desired receiving substrate. The need to use low viscosity fluids makes it challenging to obtain printed features with the necessary characteristics.

Ink jet and ink-jet-style fluid applicators have been used to dispense numerous types of non-ink type fluids, including adhesives, plastics, wax, and ultraviolet (UV) curable materials, as well as a wide variety of other materials. In one case, an ink-jet-style selective deposition process was used with multiple print heads to build three dimensional models by depositing thermoplastic material, wax and bulk filling materials. In another case, multiple print heads were used in a drop-on-demand process to produce a wide variety of devices, including electronic devices, medical devices, and lenses, by selectively depositing various materials onto various substrates. In some situations, the multiple print heads are independently controlled and deposit different materials, however, in other situations the multiple print heads are controlled together or draw from a common reservoir.

Although extremely useful in a variety of applications, ink jet printing techniques include some drawbacks. The high resolution capability of the ink jet devices is achieved at the price of volumetric speed and coating thickness. Ink jet printers can be extremely slow relative to other types of fluid applicators. In situations where a large volume of fluid must be deposited, for example, ink jet printing becomes a less desirable technique. When speed and/or large volume deposition are desired, other types of print heads or fluid application techniques are commonly chosen, usually at a sacrifice of the resolution. There is, therefore, an ongoing need for fluid applicators that are capable of non-contact deposition of multiple types of fluid materials onto a variety of substrates, and that are capable of producing high resolution coatings with increasing thickness and volumetric speeds.

SUMMARY OF THE INVENTION

The present invention meets these requirements for more versatility in fluid deposition with a multiple resolution, non-contact fluid applicator capable of both high resolution and high throughput fluid deposition. The fluid applicator includes a fluid dispensing system for dispensing fluid material, a substrate handling system for positioning a substrate with respect to the fluid dispensing system and a control system for controlling the dispensing of the fluid material onto the substrate. The fluid dispensing system includes a first fluid dispensing mechanism that dispenses a first fluid material at a first resolution and a first throughput resulting in a coating having a first thickness. It also includes a second fluid dispensing mechanism that dispenses a second fluid material at a second resolution, throughput and coating thickness that may be different from the first resolution, throughput and coating thickness, respectively. The first and second fluid dispensing mechanisms use different fluid dispensing technologies to dispense the first and second fluid materials, respectively, therefrom. The control system positions the substrate and the first and second fluid dispensing mechanisms with respect to each other and controls the dispensing of the fluid materials onto the substrate in a predetermined pattern and with a controllable coating thickness and volumetric speed. Additional fluid dispensing mechanisms may also be used as needed to increase volumetric speed and coating rate for a desired coating material at a desired thickness, or may be used to achieve other functionality, such as a specific resolution.

The fluid dispensing mechanisms preferably include an ink jet print head capable of high resolution deposition of a fluid material. The high resolution mechanism may be used to deposit an accurate border that defines an article to be formed with the substrate. The fluid dispensing mechanisms also preferably include another jetting device, such as a stream jet and/or spray jet, typically capable of lower resolution but higher throughput deposition of a fluid material. The higher throughput device may then be used to rapidly fill in areas of the article with desired fluid as defined by the high resolution border.

The fluid applicator is capable of producing a large variety of articles including the substrate and deposited fluid materials. These articles preferably may include adhesive deposited by the fluid dispensing system, alone or in combination with other jettable materials.

A method of dispensing a fluid material at multiple resolutions and multiple throughput levels is also described including the step of providing a first fluid dispensing mechanism that dispenses a first fluid material at a first resolution and a first throughput using a first fluid dispensing technology. The step also includes providing a second fluid dispensing mechanism that dispenses a second fluid material at a second resolution that is different from the first resolution and a second throughput that is different from the first throughput using a second fluid dispensing technology that is different from the first fluid dispensing technology. The method also includes the steps of providing first and second fluid materials, providing a substrate onto which the first and second fluid materials are to be dispensed, and dispensing the first and second fluid materials onto the substrate in a predetermined pattern by contemporaneous activation of the first and second fluid dispensing mechanisms when positioned with respect to the substrate in a desired location. The method may also include providing additional fluid dispensing mechanisms and fluid materials, as well as the step of dispensing those additional materials.

In addition, a method of forming an article from a substrate and fluid material is described that includes the step of providing a first fluid dispensing mechanism that dispenses a first fluid material at a first resolution and a first throughput using a first fluid dispensing technology, and a second fluid dispensing mechanism that dispenses a second fluid material at a second resolution that is different from the first resolution and a second throughput that is different from the first throughput using a second fluid dispensing technology that is different from the first fluid dispensing technology. This method also includes the steps of providing first and second fluid materials, providing a substrate onto which the first and second fluid materials are to be dispensed, and dispensing the first and second fluid materials onto the substrate in a predetermined pattern by contemporaneous activation of the first and second fluid dispensing mechanisms when positioned with respect to the substrate in a desired location. In addition, the step of processing the first fluid material, second fluid material and substrate combination to produce an article, is also included.

DETAILED DESCRIPTION OF THE INVENTION

Figure 1:
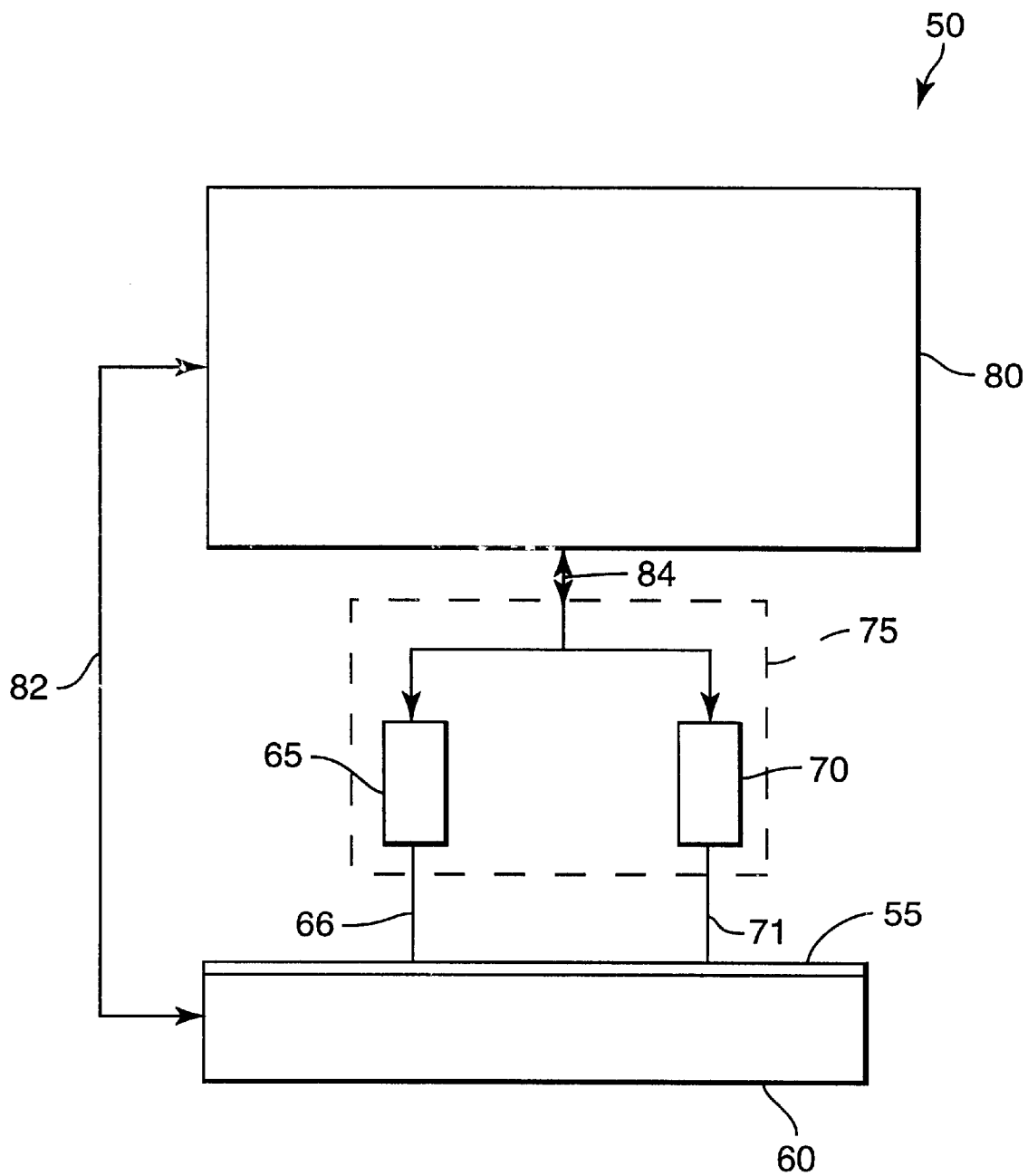
FIG. 1 is a block diagram of one embodiment of a multiple resolution fluid applicator in accordance with the present invention, including a substrate handling system, a fluid dispensing system and a control system.

With reference to the attached Figures, it is to be understood that like components are labeled with like numerals throughout the several Figures. FIG. 1 is a diagram generally depicting an embodiment of a multiple resolution fluid applicator 50 in accordance with the present invention configured to deposit one or more fluid materials onto a substrate 55 or other surface at multiple resolutions and multiple throughput levels. The fluid applicator 50 includes a substrate handling system 60 configured to receive and present the substrate 55 to a fluid dispensing system 75. The substrate handling system 60 may include positioning capability, such that the substrate 55 may be positioned relative to the fluid dispensing system 75 in one or more directions.

The fluid dispensing system 75 includes a plurality of fluid dispensing mechanisms, such as first and second fluid dispensing mechanisms 65 and 70, respectively, configured to dispense first and second fluid materials 66 and 71, respectively, at different resolutions and different throughput levels relative to each other. The first and second fluid materials 66, 71 may be the same fluid material, or may be different fluid materials, as desired. The fluid dispensing system 75 provides for the introduction of the fluid materials 66, 71 to the fluid dispensing mechanism 65, 70, as well as the operation of each mechanism 65, 70 in dispensing the fluid materials 66, 71 onto the substrate 55. The fluid dispensing system 75 may also be configured to position the plurality of fluid dispensing mechanisms, such as 65, 70, relative to the substrate handling system 60 or other reference.

The fluid applicator 50 also includes at least one control system 80 that controls the substrate handling system 60 and the fluid dispensing system 75. In a preferred embodiment, a single overall control system 80 connects to both the substrate handling system 60 and the fluid dispensing system 75, such as at connections 82 and 84, respectively, thereby more readily coordinating control of both systems 60, 75.

Figure 2:
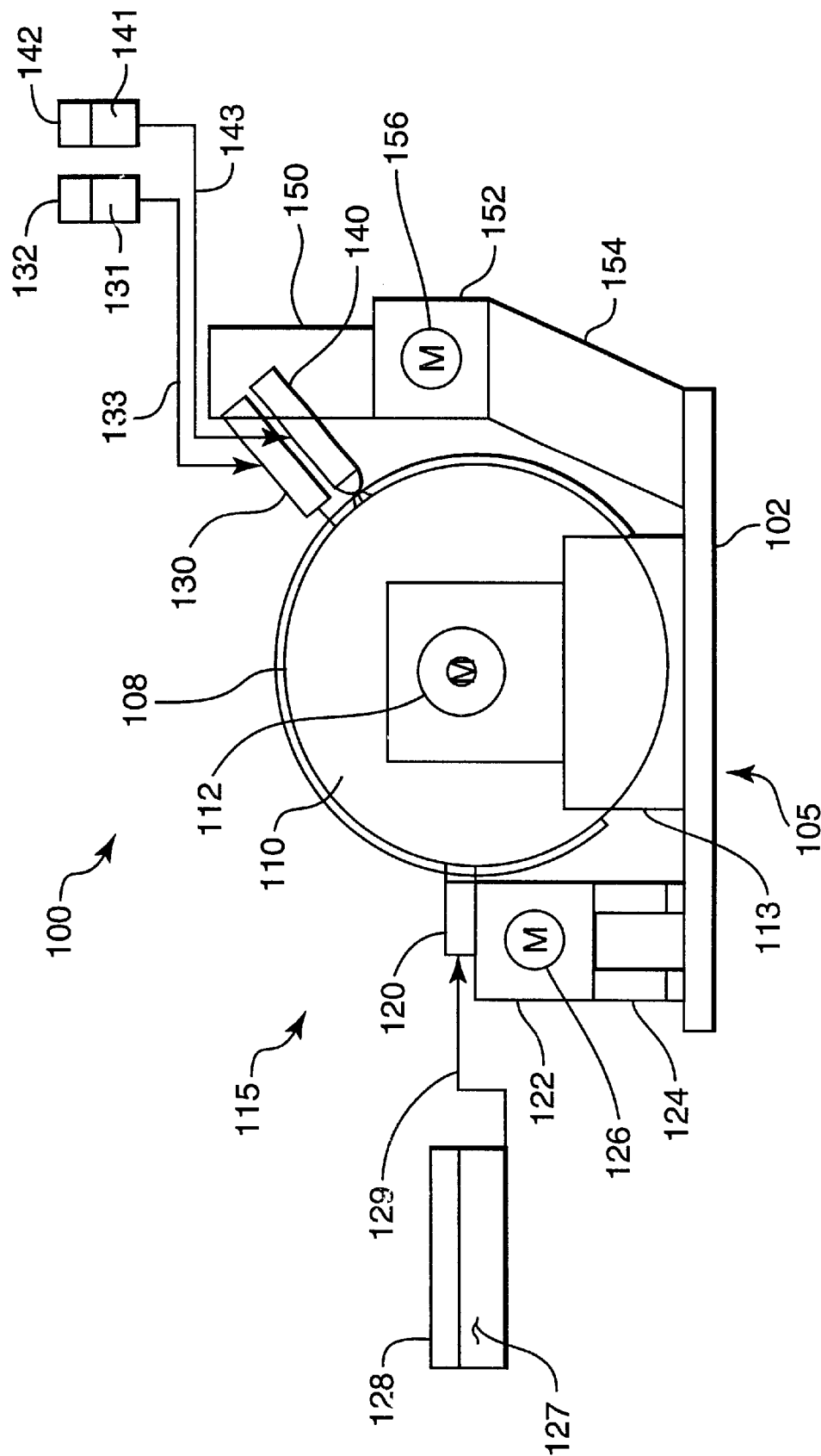
FIG. 2 is a diagram of a second embodiment of a multiple resolution fluid applicator in accordance with the present invention, in which a substrate is introduced on a revolving drum.

Referring now to FIG. 2, a more detailed embodiment of a multiple resolution fluid applicator 100 in accordance with the present invention is shown. In this embodiment, the fluid applicator 100 includes a substrate handling system 105 having a rotatable drum 110 driven by drum motor 112 for use in presenting and controlling a substrate 108 onto which a fluid or fluids are to be applied. The substrate 108 may be in the form of sheet material or a continuous web, and may include one or more types of materials onto which application of a fluid is desired. These materials may be flexible in order to conform to the contour of the drum 110, or may be one or more relatively rigid items provided in segmented or separate form. Suitable materials may include, but are not limited to, papers (coated or uncoated), polymeric films, textiles, paperboard (coated or uncoated), multiple layer laminates, wood, plastics, metals, foils or liquids. The substrate 108 may itself be the material being coated, or may be a carrier supporting the material or materials being coated.

The diameter and length of the drum 110 may vary depending on the desired size of the substrate 108 to be used and the overall desired size of the fluid applicator 100. In one embodiment, the drum 110 was formed with a diameter of about 10 inches (25.4 centimeters) and length of about 20 inches (50.8 centimeters). The drum 110 may include a vacuum system to hold the substrate 108 in place during fluid deposition. The drum 110 may optionally be cooled by an internal cooling system, such as a chilled water system as known in the art, or by other known methods. Alternatively, the drum 110 may be heated, if desired, by an internal heating system or other known methods. In addition, the drum 110 may also be provided with both cooling and heating capability, if desired, to provide more versatility to the fluid applicator 100.

The drum 110 and drum motor 112 are preferably mounted in a suitable manner that accommodates handling of the substrate 108. In this embodiment, the drum 110 is supported by a mounting bracket 113 that is, in turn, supported on a base plate 102. The drum 110 is preferably also supported along its longitudinal axis at its opposite end by a corresponding mounting bracket (not shown). Both mounting brackets preferably include bearings (not shown) to provided smooth rotation of the drum 110. The drum motor 112 is then suitably coupled to the drum 110, including the use of gearing reductions or other components to control the motion and inertia of the drum 110, and is supported from mounting bracket 113, as shown. The mounting bracket 113 may be designed to provide one or more areas of adjustability with respect to the drum 110, the motor 112 and/or the base plate 102. Alternatively, other types of support structures and motor mounting methods, as are known in the art, may be used, which provide the necessary support, adjustability, and drum rotation.

Fluid applicator 100 also includes a fluid dispensing system 115 having a plurality of fluid dispensing mechanisms that preferably provide non-contacting deposition of one or more fluids onto the substrate 108 at multiple resolutions and multiple throughput levels. As used herein, throughput refers to the volumetric speed of the mechanism related to the volume of fluid dispensed over an area of the substrate 108 based on the linear speed of the mechanism and movement of the substrate 108. Throughput affects the thickness of the material deposited on the substrate 108 in any given area.

One of these fluid dispensing mechanisms preferably is an ink jet print head ("ink jet") 120, which may be slidably mounted to the base plate 102 adjacent to the drum 110. The ink jet 120 is supported on a linear slide mechanism 122, which is then mounted to base plate 102 by slide support 124. Slide mechanism 122 provides supported linear movement of the ink jet 120 as it scans longitudinally along the drum 110. A slide motor 126 drives the slide mechanism 122 in continuous or step-wise movement, as desired. Slide support 124 may include one or more directions of adjustability with respect to the base plate 102, drum 110 and/or motor 126. Adjustability in mounting of both the drum 110 and ink jet 120 is preferably provided in order to calibrate or otherwise adjust the drum 100 and ink jet 120 relative to one another to facilitate accurate positioning and control of the ink jet 120 relative to the substrate 108 and the drum 110.

The ink jet 120 is preferably mounted perpendicular to the surface of the drum 110, as shown, at about the mid-line of the drum 110. Location of the ink jet 120 with respect to the drum 110 may vary as desired, or as needed to accommodate the layout requirements of applicator 100. However, the angle of the ink jet 120 with respect to the scan line across the drum 110 affects the resolution of the material deposited, and thus is generally more closely regulated.

As stated above in the Background section, ink jet printers operate by ejecting a fluid onto a receiving substrate in controlled patterns of fluid droplets. By selectively regulating the pattern of fluid droplets, ink jet printers can produce a wide variety of high resolution printed features. Ink jet print heads, such as the ink jet 120, may use one of a number of different technologies to cause the ejection of the fluid droplets. These ink jet technologies include continuous, impulse and drop-on-demand jetting. In a preferred embodiment, ink jet 120 is configured for impulse ink jet technology, utilizing either piezoelectric or thermal actuation. Thermal ink jetting (also known as "bubble jetting") uses a small heater to create a vapor bubble, expelling liquid droplets at an orifice. Piezoelectric ink jetting uses a piezoelectric transducer to create a pressure wave that expels droplets from an orifice. However, it is to be understood that many of the currently available inkjet devices may be adapted for use in the present invention. Ink jet print heads suitable for use with the present invention are available from a variety of dealers/manufacturers, including but not limited to Trident International—an ITW Company, Spectra, Hewlett Packard, Xaar Ltd., Xerox and MicroFab.

The ink jet 120 is supplied with jettable material 127 from a reservoir 128 in fluid communication with the ink jet 120. The reservoir 128 and/or fluid communication path 129 may be heated or cooled to supply the fluid material 127 at a desired temperature and/or viscosity in order to ensure proper jetting of the material 127. Typically, the ink jet 120 itself may also be heated to affect the viscosity of the fluid material 127 at the time of jetting. In addition, the reservoir 128 may be provided with a pressure regulation system (not shown) that places the fluid material 127 under positive or negative pressure within the reservoir 128 and fluid communication path 129. In particular, ink jets 120 typically use capillary action to refill and thus require a negatively pressurized system relative to the outlet of the ink jet 120. Optionally, the reservoir 128 and fluid path 129 may be provided with other systems to control the storage and dispensing environment of the fluid material 127, as needed based on the requirements of the material 127 and/or specific application. In addition, systems may be provided to purge the reservoir 128, fluid path 129 and ink jet 120 for cleaning and material change over. Materials to be dispensed and their requirements will be discussed in more detail below.

Ink jet print heads, such as ink jet 120, have a relatively high resolution capability as compared with other types of printing devices, however they also are relatively slow at depositing fluid in a desired manner relative to the number of dispensing orifices included in the ink jet 120. Ink jet print heads may be provided with various resolutions, with varying ranges of print image size capability and with varying speed capabilities. In one embodiment, the ink jet 120 is a piezoelectric impulse print head, such as a MICROCODER print head available from Trident International—an ITW Company, Brookfield, Conn., configured to produce a maximum 10,000 drops per second at configurable resolutions. This relates to a maximum dispense rate of about 2.5 to about 3 milliliters of fluid per minute given an approximate drop volume of 100 picoliters in about a 0.23 inch (0.58 centimeter) print width. The ink jet 120 includes 16 channels having three orifices per channel, thereby providing 48 total orifices usable for deposition of the fluid material 127. It is to be understood, however, that other channel and orifice configurations, as well as other resolutions, volumes and speed characteristics for the ink jet 120 are possible and within the scope of the present invention. The ink jet 120 may be configured to deposit fluid material 127 in a single pass, or may be configured to make multiple passes to deposit a sufficient volume of fluid material 127 upon the substrate 108 in the desired pattern. Alternatively, multiple inkjet print heads (120) may duplicate the pattern to deposit a sufficient volume of fluid material 127 upon the substrate 108.

The fluid dispensing system 115 also includes two additional fluid dispensing mechanisms 130 and 140, which provide fluid material dispensing at a different resolution and different throughput level using a different dispensing technology or process than the ink jet 120. In this embodiment, these fluid dispensing mechanisms include stream jet 130 and spray jet 140. Both of these additional dispensing mechanisms 130, 140 are mounted to a second linear slide mechanism 152 by way of a mounting bracket 150, or other suitable device. The mounting angle of spray jet 140 provided by mounting bracket 150 is preferably perpendicular to the drum 110, in order to better control the fluid pattern dispensed by the spray jet 140. Second slide mechanism 152 is then mounted to base plate 102 by second slide support 154. Second slide mechanism 152 provides supported linear movement of the stream jet 130 and spray jet 140 longitudinally along the drum 110. A slide motor 156 drives the second slide mechanism 152 in continuous or step-wise movement, as desired. Second slide support 154 may include one or more directions of adjustability with respect to the base plate 102, drum 110 and/or motor 156.

Alternatively, the one or more additional fluid dispensing mechanisms, such as dispensing mechanisms 130 and 140, may be mounted for independent movement and control upon base plate 102, if desired. The independent mounting may include independent slide mechanisms, independent brackets mounted to the same slide mechanism, or other suitable mounting devices. Although shown in this embodiment to include three jets, the fluid applicator 100 may optionally include only two, or more than three jets, as desired to meet the fluid deposition requirements of a particular application or for a particular applicator 100. Optionally, the fluid applicator 100 may include a plurality of mounting and control mechanisms usable with one or more removable and/or interchangeable fluid dispensing mechanisms, thereby providing adaptability and versatility to the fluid applicator 100. In this embodiment, fluid dispensing mechanisms may be added, changed or removed to meet the fluid dispensing requirements of a specific application.

In one embodiment, the stream jet 130, such as a 740V-SS needle valve from EFD Inc. in East Providence, R.I., includes a pneumatic or electromagnetic actuated needle valve which is preferably controllable by a computer or other microprocessor, or by other electronic control devices. Movement of a needle against and away from a needle seat allows for fluid under pressure to be ejected from a dispensing tip in a controlled and accurate stream. The amount of fluid that flows through the stream jet 130 may be determined by the open time of the needle valve, the fluid pressure, the dispensing tip output size, fluid viscosity and flow control adjustment. The stream jet 130 is supplied with fluid material 131 from a reservoir 132 in fluid communication with the stream jet 130 via a fluid path 133. Although the stream jet 130 typically has a lower resolution than the ink jet 120, it is capable of higher throughput with precise deposits of fluid material 131. The apparent resolution is in the range of about 150 drops per inch (about 59 drops per centimeter) in volumes of about 20 milliliters per minute. Alternatively, other devices capable of dispensing controlled and accurate continuous or non-continuous streams of fluid onto a substrate while being transported may be used, including but not limited to positive displacement dispensers, extrusion nozzles, sonic jets and orifice plates. As with the ink jet 120, the stream jet 130 may be configured to make single and/or multiple passes, as needed to deposit the desired volume of fluid material 131 upon the substrate 108 in the desired pattern. Alternatively, multiple stream jet units (130) may be configured in parallel to produce the desired pattern at the desired volume of fluid material 131.

The reservoir 132 is configured to supply the fluid material 131 in any suitable manner. For example, the reservoir 132 may be configured to supply the fluid material 131 as a liquid with a head pressure or as a liquid with a piston and head pressure. Other configurations include, but are not limited to, positive pressure pumps, positive displacement pumps with pressure feedback, or positive displacement pumps coupled to the dispenser actuation. The fluid communication path 133 may include a flexible tubular connection, or it may be bendable or jointed.

As with the ink jet 120 and reservoir 128, the stream jet reservoir 132 and fluid path 133 may be heated, cooled, supplied under positive or negative pressure, and/or configured in another manner as needed to suitably supply the fluid material 131 as required by the stream jet 130 and the fluid material 131 being dispensed. The fluid material 131 may be, but is not required to be, the same as fluid material 127 dispensed by the ink jet 120.

In one embodiment, the spray jet 140, such as a 780S-SS spray valve from EFD Inc. in East Providence, R.I., includes a pneumatic or electromagnetic actuated piston preferably controllable by a computer or other microprocessor, or by other electronic control devices. The piston retracts from a nozzle to allow the fluid material 141 to flow from the spray jet 140. Atomizing air (not shown) supplied and controlled at preferably low volume and low pressure flows around the nozzle to disperse the fluid into fine droplets upon expulsion from the spray jet 140. The fluid material 141 may be dispensed continuously or non-continuously in various patterns and at varying diameters, such as fan or round patterns with diameters (or elliptic widths for fan patterns) ranging from about 0.25 inch (about 0.64 centimeter) to about 1 inch (about 2.54 centimeters). The spray jet 140 is supplied with fluid material 141 from a reservoir 142 in fluid communication with the spray jet 140 via a fluid path 143. Although the spray jet 140 typically has a lower resolution than both the ink jet 120 and the stream jet 130, it is capable of higher throughput with larger areas of deposited fluid material 141 in volumes of about 40 milliliters per minute. As with the ink jet 120, the spray jet 140 may also be configured to make single and/or multiple passes, as needed to deposit the desired volume of fluid material 141 upon the substrate 108 in the desired pattern, or multiple spray jet units (140) may be configured in parallel to produce the desired pattern at the desired volume of fluid material 141.

In a like manner as reservoir 132 and fluid path 133, reservoir 142 and fluid path 143 may be configured in many different ways to meet the needs of a particular fluid applicator 100 or fluid application. See discussion above for details.

As with the ink jet 120 and reservoir 128, the spray jet reservoir 142 and fluid path 143 may be heated, cooled, supplied under positive or negative pressure, and/or configured in another manner as needed to suitably supply the fluid material 141 as required by the spray jet 140 and the fluid material 141 being dispensed. The fluid material 141 may be, but is not required to be, the same as fluid material 127 dispensed by the ink jet 120 and/or the fluid material 131 dispensed by the stream jet 130. Optionally, the spray jet 140 and the stream jet 130 may share a common reservoir if the fluid material 141 or 131 being dispensed by both jets 140, 130 is the same and both jets 140, 130 have the same fluid supply requirements.

The fluid materials 127, 131 and 141 to be dispensed by the ink jet 120, stream jet 130 and spray jet 140, respectively, may be the same for all three fluid dispensing mechanisms, as stated above. However, these materials 127, 131, 141 may also be different from each other, or may be the same for two, but not all, mechanisms. Each fluid dispensing mechanism has its own requirements that must be met by the fluid material being dispensed in order to ensure reliable and repeatable deposition of fluid material by that mechanism. These requirements may be different for each mechanism, as described below.

The fluid material requirements of the ink jet 120 may differ depending on the ink jetting technology employed by the ink jet 120 being used for a particular fluid applicator 100, or a particular application. In the embodiment described above using impulse ink jet technology, the requirements for the fluid material 127 may differ depending on whether thermal or piezoelectric ink jetting is being performed. For example, a typical fluid for thermal inkjetting typically has a viscosity in the range of 3 to 5 centiPoise at 25° C., while piezoelectric fluids typically have a viscosity in the range of 5 to 30 centiPoise at the jetting temperature.

Fluid materials usable with the fluid applicator of the present invention include generally known jettable materials, such as: solvent-based solutions and/or dispersions; water-based emulsions, suspensions and/or dispersions; curable monomers, oligomers and mixtures thereof that may be cured by ultraviolet radiation, electron-beam or gamma radiation, thermal curing or moisture curing; and hot melts that may be physically crosslinked, moisture cured, radiation crosslinked, and/or ionomerically crosslinked. Each category of materials has its own characteristics that must be accommodated by the fluid dispensing mechanism being used to dispense the material, as well as the reservoir and fluid communication path for that mechanism.

These categories each include numerous specific materials that may be formulated for various applications and purposes, including but not limited to inks, adhesives, adhesive precursors, activators, pressure sensitive adhesives, and release materials. In addition, other types of fluid materials are being developed for use with jetting technologies. The ability to deposit adhesives using an ink jet device with the high resolution and accuracy provides a great deal of versatility and adaptability in the production of numerous types of articles, as described below. By providing both high resolution and high throughput capability with the deposition of adhesives, the fluid applicator of the present invention makes possible a whole realm of article manufacture within numerous industries.

Optionally, the fluid materials being dispensed by the fluid applicator may contain one or more additive components necessary for the creation of specific articles or for specific applications. These additives may include pharmaceutical compounds for the creation of medical related articles. Alternatively, the additives may include conductive materials or other suitable materials usable for electronic related articles. In addition, other types of additive compounds or components may also be formulated to be dispensed via jetting technology in order to produce articles having desired characteristics.

As is apparent from the above discussion on jettable fluid materials, the choice of fluid material 127 to be dispensed by ink jet 120 may require additional components within fluid applicator 100 to dry, cure or otherwise completely process the fluid material 127 after deposition onto the substrate 108. Alternatively, the additional components to complete processing of the fluid material 127 and substrate 108 may be provided separately from the fluid applicator 100, if desired.

Figure 3:
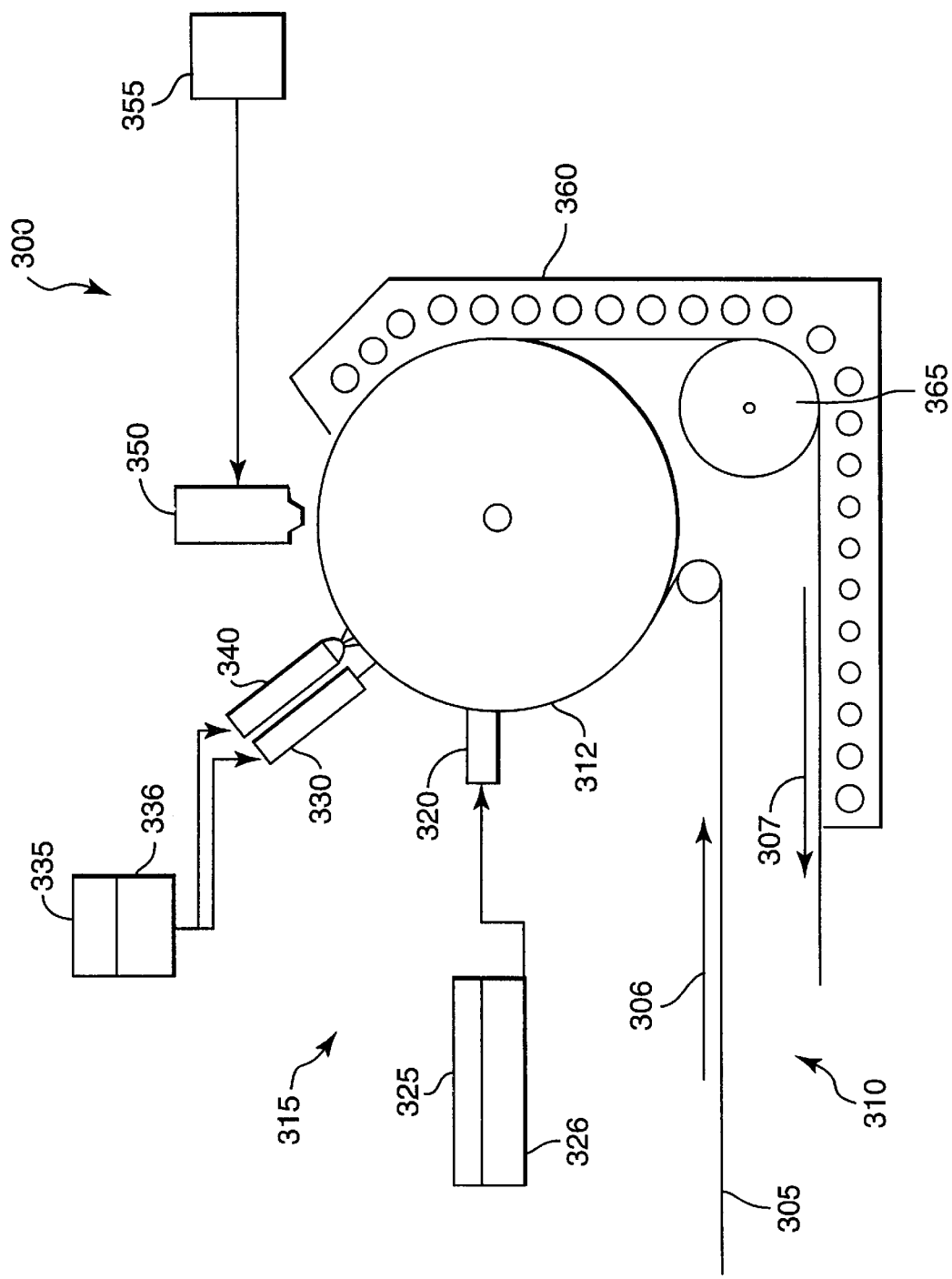
FIG. 3 is a diagram of a third embodiment of a multiple resolution fluid applicator in accordance with the present invention, including an ultraviolet curing chamber.

Referring now to FIG. 3, a third embodiment of a fluid applicator 300 in accordance with the present invention is shown into which a substrate 305 enters as a continuous web in an input direction 306. The substrate 305 is handled by a substrate handling system 310 including a rotatable drum 312, whose mounting and drive hardware are not shown for clarity. A fluid dispensing system 315 includes a plurality of fluid dispensing mechanisms capable of dispensing fluid materials at a plurality of resolutions and throughputs. In particular, an ink jet 320 fed with a jettable fluid material 326 from reservoir 325 deposits the fluid material 326 upon the substrate 305 as it passes by the ink jet 320, either with a constant or indexed motion. A stream jet 330 and a spray jet 340 also deposit a fluid 336 provided by reservoir 335 upon the substrate 305 as it passes by the stream and spray jets 330, 340. In this embodiment, both the stream and spray jets 330, 340 dispense the same fluid 336 provided in the single reservoir 335. Optionally, a fourth fluid dispensing mechanism 350, such as a blown microfiber unit or a positive displacement mechanism may be supplied from a source 355, may additionally deposit material onto the substrate 305 as it passes by upon the drum 312.

Also included in this embodiment is an ultraviolet curing chamber (UV chamber) 360 positioned adjacent to the drum 312, which is operated using a nitrogen gas environment (or other suitable environment). The substrate 305, upon which one or more fluid materials 326, 336 have been deposited, continues around the drum 312 interposed between the drum 312 and the UV chamber 360. An additional roller 365 is included to route the substrate 305 through the remainder of the UV chamber 360 and out of the chamber 360 in a direction 307 opposite of input direction 306. It is to be understood, however, that other types of curing devices and substrate routings are also possible and are within the scope of the present invention. By incorporating the UV chamber 360 into the fluid applicator 300, the use of desirable curable jettable fluid materials may be accommodated, thereby decreasing and/or eliminating the need for volatile solvents, cumbersome drying equipment, or other less desirable conditions.

Alternatively, the UV chamber 360 may be replaced by a drying unit, a solvent vapor ventilation system, other types of curing chambers, such as microwave, actinic, gamma or other radiation chambers, or other desirable or necessary equipment to complete the processing of the fluid material being dispensed upon the substrate 305. Optionally, more than one type of processing unit may be included in the fluid applicator 300 in order to accommodate the processing needs of different types of jettable fluid materials. In some circumstances, it may be desirable to deposit different fluid materials by the different jetting mechanisms and/or technologies available, i.e., one material by ink jet and another by stream and/or spray jet, with the different materials requiring different types of processing. That is, the ink jet material may need to be UV cured, whereas the stream/spray jet material may be water-based and need to be dried. It is to be understood that any combination of fluid dispensing mechanisms and fluid material processing equipment may be included in a fluid applicator, and all are within the scope of the present invention.

Figure 4:
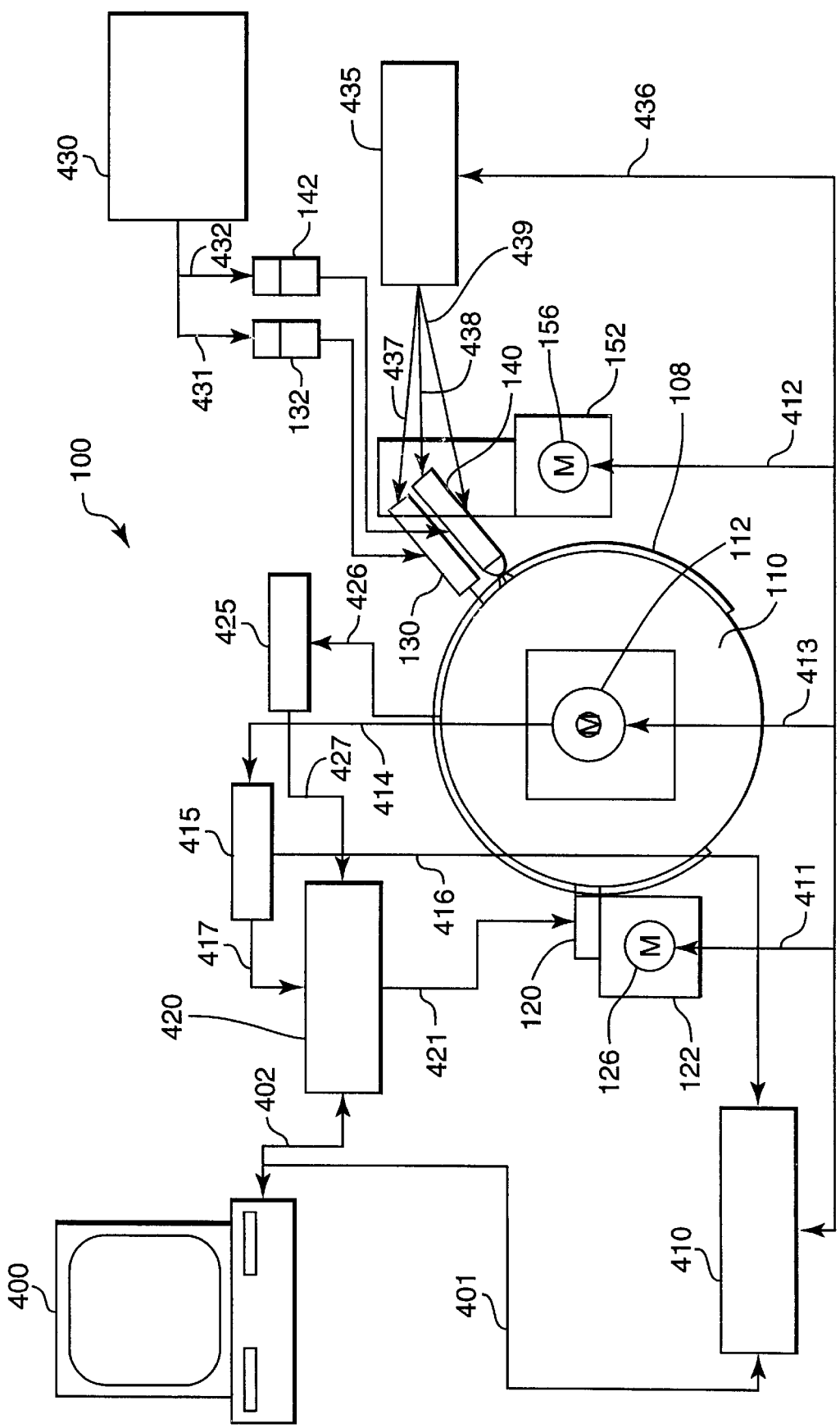
FIG. 4 is a diagram of the multiple resolution fluid applicator of FIG. 2, showing the electronic and control components.

Referring now to FIG. 4, an alternate view of fluid applicator 100 shown in FIG. 2 is provided without the hardware support components, but including electronic and control components. As described above, drum 110 is coupled for rotational movement to motor 112, with ink jet 120 coupled for linear movement longitudinally along drum 110 to slide 122 powered by motor 126. In a similar manner, stream jet 130 and spray jet 140 are coupled for linear movement to slide 152 powered by motor 156. Each motor 112, 126, 156 is electronically connected to a control unit 400, preferably a computer or other microprocessor, such as a personal computer running IM 64 imaging software (available from Trident International—an ITW Company) and motion control software, such as MOTION ARCHITECT by Compumotor (a division of Parker) or MOTION PLANNER also by Compumotor, or other suitable software. Alternatively, the control unit 400 may be another type of control device or multiple control devices that may be running other types of software or may be otherwise programmed to control the deposition of fluid material in a desired manner.

The two slider motors 126, 156 are connected at lines 411 and 412, respectively, to the control unit 400 at line 401 through an input/output (I/O)/axis control interface unit 410 that provides motion control signals to position the fluid dispensing mechanisms in the desired location longitudinally with respect to the substrate 108 mounted on the drum 110. As used herein, the term "line" refers to any suitable connection between electronic components, including but not limited to single wire, multiple wire, serial, parallel, infrared or other type of connection now known or later developed.

The drum motor 112 is also connected to control unit 400 through the I/O unit 410 at line 413. In addition, the drum motor 112 is connected to an encoder 415 at line 414, which is in turn connected back to the I/O unit 410 via line 416, to provide feedback as to the position of the drum 110 about its longitudinal axis and thus the position of the substrate 108 mounted on the drum 110 with respect to ink jet 120, stream jet 130 and spray jet 140. In this embodiment, the encoder 415 is also connected to an ink jet interface unit 420 at line 417. The interface unit 420 may be a control box for controlling the movement and firing of the ink jet 120, such as is commercially available from Trident International—an ITW Company, or is otherwise known. The control box may contain, among other things, digital processing boards, remote drive boards and/or temperature controllers. The interface unit 420 controls the introduction of fluid material to the ink jet 120 for filling of an internal reservoir, introduction of the electrical fields required to activate the piezoelectric transducers, as well as sequencing of the channels within the ink jet 120 to vary the fluid deposition by the ink jet 120, as needed. The interface unit 420 is in turn connected to the control unit 400 at line 402. Alternatively, the control of the ink jet 120 may be provided directly by the control unit 400 configured with the necessary hardware components for independent driving and control of each fluid dispensing mechanism, if desired.

The control unit 400 coordinates the operational control of the ink jet 120 by the interface unit 420 with the positional control of the drum 110, so as to provide desired deposition of fluid by the ink jet 120 onto the substrate 108 mounted on drum 110 in an accurate and repeatable manner. A photo eye 425 may also be provided, as shown in this embodiment, attached to the drum 110 to monitor the revolutions of the drum and to act as a registration of the substrate 108 with respect to the ink jet 120. As the drum 110 rotates, the ink jet 120 may provide a continuous deposit of fluid material upon the substrate 108, effectively producing a spiral-like deposit. Alternatively, the photo eye 425 may be used to precisely "home" the drum 110 for registration purposes. A connection between the I/O unit 410 and the interface unit 420 may then be used to provide a trigger signal to index the drum 110 as the ink jet 120 scans across the drum 110. In this embodiment, the ink jet 120 deposits fluid material upon the substrate 108 in controlled linear sequences.

The stream jet 130 and spray jet 140, as described above, are operated through the input of the fluid material in an appropriate condition, i.e., at a desired temperature, pressure, viscosity, surface tension or other characteristic, as well as the actuation of an internal piston/needle. A fluid supply system 430 connected to the stream and spray jet reservoirs 132, 142 at lines 431 and 432, respectively, provides for the pressurization of the fluids in the reservoirs 132, 142 so as to deliver fluid to the jets 130, 140 with appropriate characteristics. Actuation of the stream and spray jets 130, 140 is provided by a plurality of control solenoids 435 connected to the control unit 400 through the I/O unit 410 at line 436. One or more solenoids 435 are connected to the jets 130, 140 at lines 437, 438 and 439 to trigger flow of the fluid from the jets 130, 140, as well as control of the atomizing air flow for the spray jet 140. For both types of jets 130, 140, a basic type of on/off actuation is usually all that is required for control of the fluid deposition from the jets 130, 140, as compared to the more complex control requirements of the ink jet 120.

Figure 5:
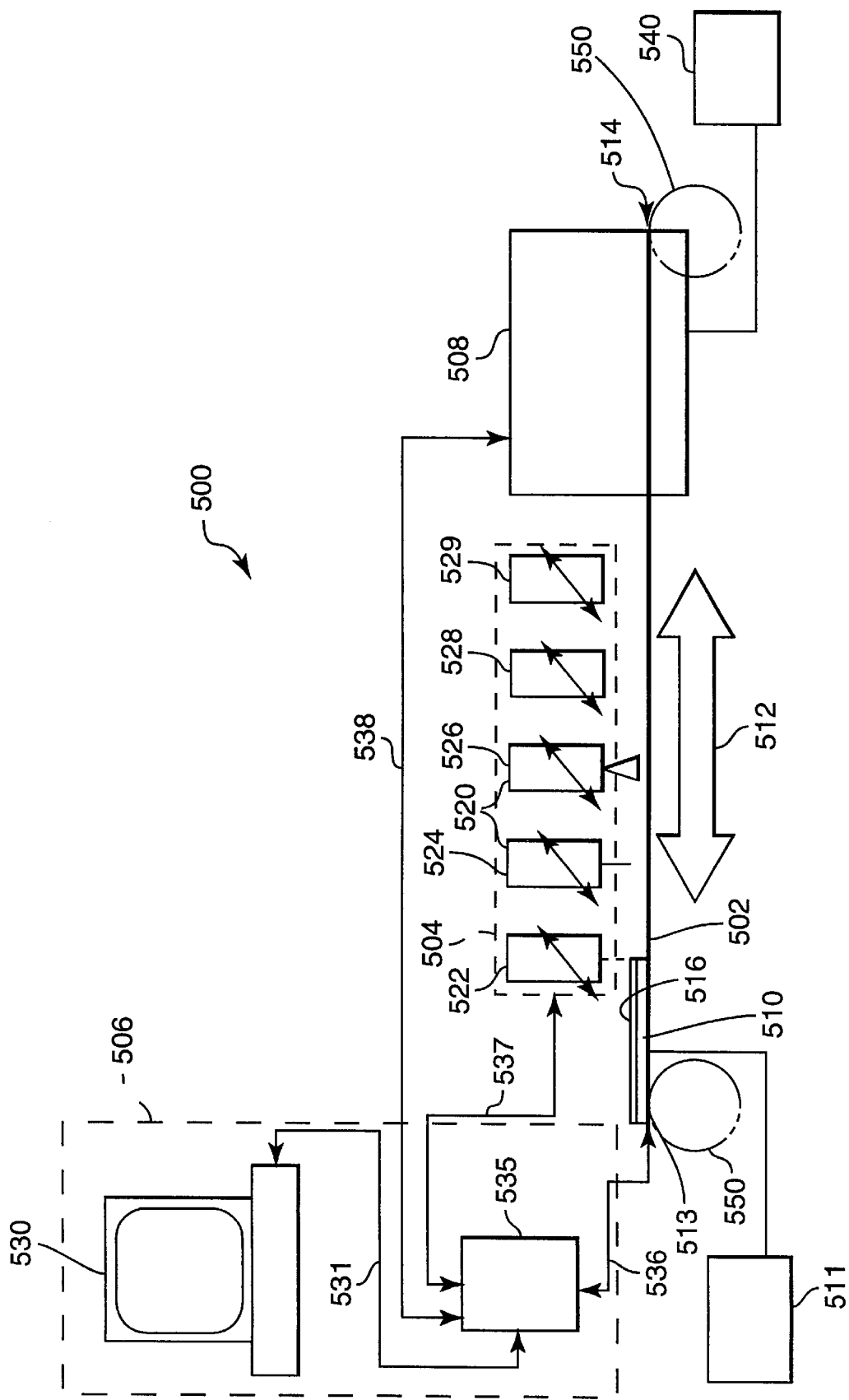
FIG. 5 is a diagram of a fourth embodiment of a multiple resolution fluid applicator in accordance with the present invention, in which a substrate is introduced on a flat bed or webline.

Referring now to FIG. 5, a fourth embodiment of a multiple resolution fluid applicator 500 is shown including a substrate handling system 502, a fluid dispensing system 504 and a control system 506 for depositing fluid material at multiple resolutions and throughputs. In this embodiment, the substrate handling system 502 is configured as a flat-bed system including a platen or table 510 that may include a vacuum system, may be heated and/or cooled, as needed. The table 510 is preferably bi-directionally indexable along an indexing axis 512 so that it may move bi-directionally in a smooth or step-wise manner along axis 512 from a first end 513 to a second end 514, to be positioned relative to the fluid dispensing system 504 for accurate and repeatable deposition of fluid material onto a substrate 516 mounted to table 510. Mounting and registration of the substrate 516 on table 510 may be provided by a vacuum system, by mechanical components, and/or by adhesives or other known fastening methods. A table actuation and movement system 511 provides the movement hardware for the substrate handling system 502, including, for example, any suitable single axis controllable positioning system. Such a positioning system may include table 510 being mounted onto one or more slides coupled to a motor driver connected for bi-directional continuous or step-wise motion control. However, other mounting, motion control and positioning hardware usable with the present embodiment are also within the contemplation and scope of the present invention.

Alternatively, the substrate handling system 502 may be configured as a webline, as shown by phantom rollers 550. In this embodiment, the substrate environment, movement, control and registration may be achieved in similar ways as those described above for the flat-bed system. In addition, other structure and methods for substrate handling, as well as mounting, motion control and positioning hardware suitable for webline systems may also be used.

In this embodiment, the fluid dispensing system 504 includes a plurality of fluid dispensing mechanisms 520, shown here to include mechanisms 522, 524, 526, 528 and 529, each mounted to deposit a fluid material onto the substrate 516 as it passes by that fluid dispensing mechanism. Each of the mechanisms 520 is mounted using appropriate hardware to be moveable with respect to the substrate 516, including perpendicular to the direction of motion 512. A first fluid dispensing mechanism 522 is preferably an ink jet type device, such as described above for ink jet 120 in FIG. 2, providing high resolution, but slower deposition of fluid material onto substrate 516. Fluid material storage and introduction hardware and connections are not shown in this figure for clarity, but would be included in this embodiment as needed to introduce the fluid material in a suitable manner to meet the requirements of the fluid dispensing mechanisms 520, the fluid material being dispensed, as well as the requirements of the application. Although described as the first, second, etc., fluid dispensing mechanisms in this embodiment, it is to be understood that no particular order is implied by these designations, they are only used for clarity in discussing the components. The fluid dispensing mechanisms 520 may be positioned in any order with respect to the indexing axis 512, unless otherwise stated.

The second fluid dispensing mechanism 524 is preferably a stream jet type device, such as described above for stream jet 130 in FIG. 2, providing a lower resolution but faster deposition and higher throughput of fluid material onto substrate 516 than is efficiently provided by ink jet 522. The third fluid dispensing mechanism 526 is preferably a spray jet type device, such as described above for spray jet 140 in FIG. 2, providing lower resolution but much faster deposition and higher throughput of fluid material onto substrate 516. In addition, fourth and fifth fluid dispensing mechanisms 528, 529 are also shown. These additional fluid dispensing mechanisms 528, 529 may be of the same type as the first three fluid dispensing mechanisms 522, 524 or 526, such as second ink jet, stream or spray jet devices. By providing two or more of the same type of fluid dispensing mechanism, the fluid applicator 500 may deposit two or more different types of fluid materials at the same level of resolution and throughput. Alternatively, the additional fluid dispensing mechanisms 528, 529 may be different types of devices for dispensing different types of fluid materials, such as a blown microfiber device. Optionally, one additional mechanism 528 may be of the same type as the other fluid dispensing mechanisms 522, 524 or 526, and the other one of the additional mechanisms 529 may be a different type of mechanism. Further, the fluid dispensing system 504 may be provided with more or less than the five fluid dispensing mechanisms 520 shown in this embodiment as needed to meet the requirements of the fluid applicator 500, or to meet the requirements of a particular application.

The control system 506 provided in this embodiment preferably provides control of both the substrate handling system 502 and the fluid dispensing system 504 in a cooperating manner. A controller 530 is connected by line 531 to an I/O unit 535, preferably providing a digital control system for fluid applicator 500, however other control systems are also contemplated. I/O unit 535 is connected via representative line 536 to the substrate handling system 502. Control of the substrate handling system 502 may include actuation, temperature control, water flow for heating and cooling, as well as motion and position control of the table 510, such as by control of the table actuation and movement system 511. I/0 unit 535 is connected via representative line 537 to the fluid dispensing system 504. Control of the fluid dispensing system 504 may include independent and individual deposition control of each of the plurality of fluid dispensing mechanisms 520. The type and scope of such control will depend on the type of fluid dispensing mechanism being controlled, as well as the type and requirements of the fluid material being dispensed. The control unit 530 will coordinate the simultaneous and/or sequential actuation of the plurality of fluid dispensing mechanisms 520 along with the movement and positioning of the substrate 516 and/or plurality of fluid dispensing mechanisms 520 relative to each other.

In this embodiment, the fluid applicator 500 also includes a fluid processing system 508 that is provided to complete the processing of any or all the fluid materials being deposited by the fluid dispensing system 504. The fluid processing system 508 may include a curing mechanism, such as for example a UV curing system having an auxiliary gas handling and analysis system 540. Alternatively, the fluid processing system 508 may include other types of radiation curing systems, a drying system, a volatile solvent ventilation system, a converting system or combinations of these and other suitable systems. I/O unit 535 is connected to the fluid processing system 508 via representative line 538 providing coordinated control of the processing system 508 with that of both the substrate handling system 502 and the fluid dispensing system 504. Optionally, other fluid processing systems may be provided off-line to complete the processing of the substrate and fluid materials deposited thereon.

Figure 6:
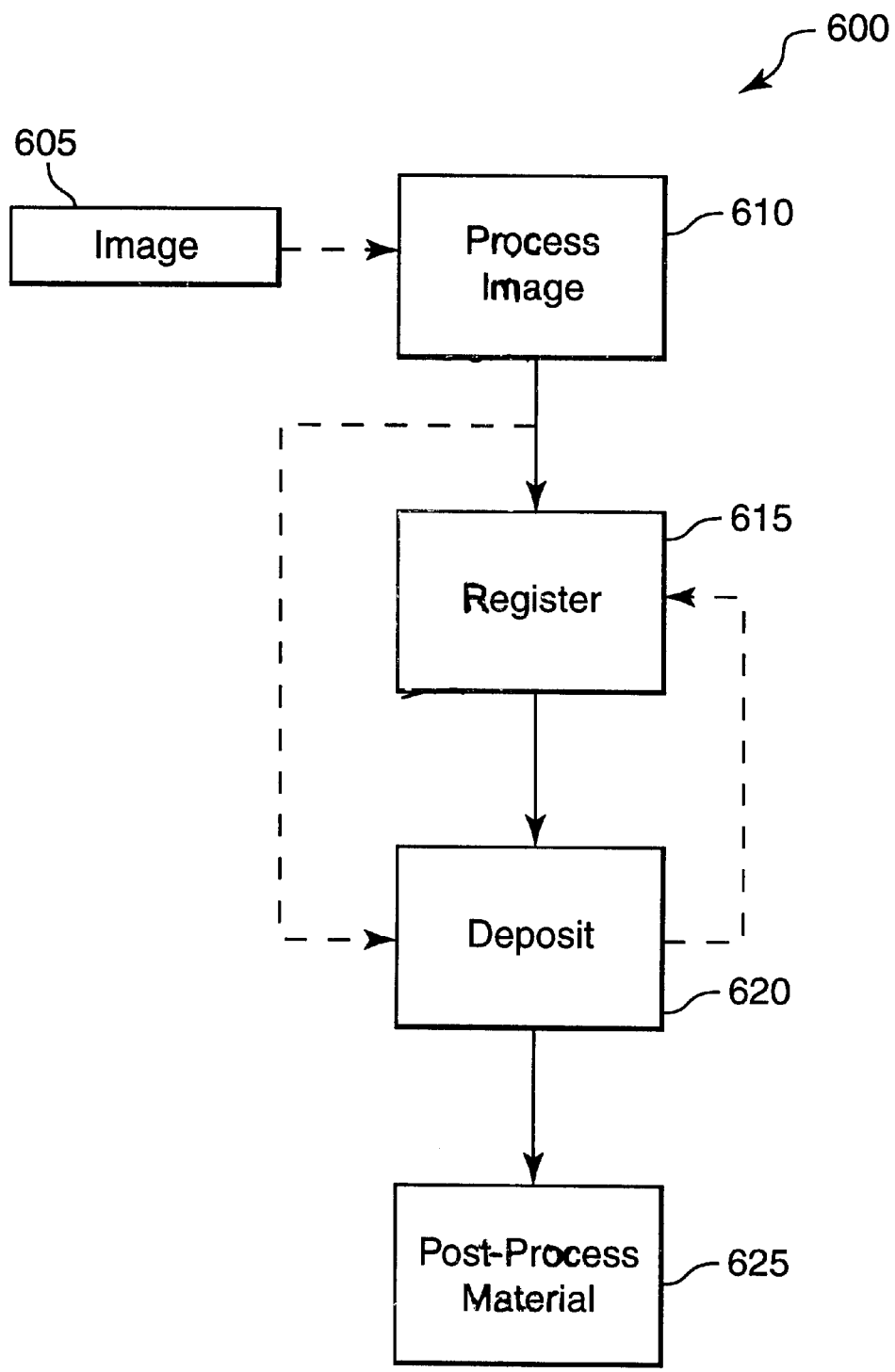
FIG. 6 is a flow chart illustrating a method of producing an article using a fluid applicator of the present invention.

Referring now to FIG. 6 (with reference back to FIGS. 2 and 5), a flow chart outlines one method 600 for producing an article containing a deposited image using the fluid applicator 100 of the present invention. The fluid applicator 100 is configured to accept a digital image, at step 605. The digital image may be formed by scanning a graphic (picture, text or both) or other image to be produced or reproduced by the applicator 100, or by downloading a digital image from a digital image producing application, from e-mail, the Internet, a CAD/CAM system or from another source. Once the digital image is available to the control unit 506, the image may be processed, in step 610, to analyze the image and assign deposition tasks to the various fluid dispensing mechanisms 120, 130 and/or 140.

If dispensing of the fluid materials 127, 131, 141 is to be done over, or in alignment with, an already produced graphic or other previously laid down material, then the fluid applicator 100 registers, in step 615 the image to be produced with the previous material. Subsequently, in step 620, the fluid materials 127, 131 and/or 141 are deposited upon the substrate 108 already appropriately loaded into the fluid applicator 100. If, however, no previous material or graphic is present, then the method proceeds to deposition of the fluid materials 127, 131 and/or 141 upon the substrate 108, in step 620. In either case, if another layer of deposited material is to be laid down, registration, in step 615, of the previously deposited material with the new material may take place.

Deposition of the materials, in step 620, is preferably configured to produce a high resolution outline or pattern of the image using the ink jet 120. The stream jet 130 is preferably used to lay down a frame, or to produce relatively good resolution features having height and/or thickness that are not efficiently possible using the ink jet 120. The spray jet 140 may then be used to bulk fill large surface areas at various height requirements. The additional fluid dispensing mechanisms, such as those described and shown in FIGS. 3 and 5, may then be used to add desired additional features to the article being produced. Optionally, the fluid applicator 100 may be configured and programmed to produce more than one article on a substrate somewhat simultaneously, such that the ink jet 120 and another jet 130 or 140 are dispensing fluid material 127, 131, 141, respectively, simultaneously but not for the same article.

Once all of the desired and/or necessary fluid materials 127, 131, 141 are deposited onto the substrate 108, the fluid materials 127, 131, 141 and substrate 108 may be subjected to post-processing, in step 625, wherein the materials 127, 131, 141 are cured, dried, ventilated and/or any other type of suitable processing to finalize the deposited materials 127, 131, 141 relative to the substrate 108. This step of post-processing 625 may occur as part of fluid applicator 100 (see description of alternative embodiments shown in FIGS. 4 and 6). Alternatively, this step 625 may occur separately from the fluid applicator 100, if desired. Optionally, one or more post-processing procedures may occur as part of the fluid applicator 100 with one or more post-processing procedures occurring separately, as well. In addition to the post-processing procedures described above, such procedures may include application of a release liner, cover layer, and/or other film, layer or device, as well as die-cutting, slitting, converting and/or other material processing. However, due to the great versatility of the fluid applicator 100, the ability to input a large variety of substrates in type, size, format, etc., and the automatic registration between materials, the need for die-cutting and/or other waste producing processes is minimized.

The fluid applicator and method of the present invention are capable of producing a large variety of articles in a fast, easy and cost effective manner. Articles may be formed in sheet or continuous web format on a large variety of substrates, depending on the requirements of the article being formed. Production of articles using the fluid applicator of the present invention reduces both tooling and labor costs, reduces waste, increases low volume efficiency and provides for small part processing. In addition, the fluid applicator automates registration between subsequent layers of material, allows for instant changeover between radically different types of articles to be produced, and allows for fast development of new items. Potentially, the fluid applicator of the present invention may be produced in a compact consumer market version, such that consumers, small businesses and/or other customers may produce desired articles at home or the office in a quick, cost effective and efficient manner using readily available substrates and fluid materials sold in the consumer market.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A fluid applicator capable of both high resolution and high throughput fluid deposition comprising:
    a fluid dispensing system for dispensing fluid material, the fluid dispensing system including a first fluid dispensing mechanism that dispenses a first fluid material at a first resolution and a first throughput using a first fluid dispensing technology, and a second fluid dispensing mechanism that dispenses a second fluid material at a second resolution and a second throughput that are different from the first resolution and first throughput using a second fluid dispensing technology that is different from the first fluid dispensing technology;
    a substrate handling system for positioning a substrate with respect to the fluid dispensing system; and
    a control system for causing the fluid dispensing system to dispense the first and second fluid materials onto the substrate in a pre-determined pattern by the positioning of the substrate and the first and second fluid dispensing mechanisms with respect to each other.

2. The fluid applicator of claim 1, wherein the first and second fluid materials are the same material.

3. The fluid applicator of claim 1, wherein the first and second fluid materials are different materials.

4. The fluid applicator of claim 1, wherein at least one of the first and second fluid materials comprises an adhesive.

5. The fluid applicator of claim 1, wherein at least one of the first and second fluid materials comprises a radiation curable material.

6. The fluid applicator of claim 1, wherein the first and second fluid materials are solvent-based solutions or dispersions; water-based emulsions, suspensions or dispersions; curable monomers, oligomers or mixtures thereof that may cured using ultraviolet, electron-beam or gamma radiation, thermal curing or moisture curing; or hot melts that are physically crosslinked, moisture cured, radiation crosslinked, or ionomerically crosslinked.

7. The fluid applicator of claim 1, further comprising at least one additional fluid dispensing mechanism that dispenses a fluid material at a resolution and throughput using a fluid dispensing technology.

8. The fluid applicator of claim 7, wherein the resolution of the at least one additional fluid dispensing mechanism is the same as at least one of the first and second resolutions.

9. The fluid applicator of claim 7, wherein the resolution of the at least one additional fluid dispensing mechanism is different from both the first and second resolutions.

10. The fluid applicator of claim 7, wherein the throughput of the at least one additional fluid dispensing mechanism is the same as at least one of the first and second throughputs.

11. The fluid applicator of claim 7, wherein the throughput of the at least one additional fluid dispensing mechanism is different from both the first and second throughputs.

12. The fluid applicator of claim 7, wherein the fluid dispensing technology of the at least one additional fluid dispensing mechanism is the same as at least one of the first and second fluid dispensing technologies.

13. The fluid applicator of claim 7, wherein the fluid dispensing technology of the at least one additional fluid dispensing mechanism is different from both the first and second fluid dispensing technologies.

14. The fluid applicator of claim 13, wherein the second fluid dispensing mechanism is a stream jet mechanism.

15. The fluid applicator of claim 13, wherein the second fluid dispensing mechanism is a spray jet mechanism.

16. The fluid applicator of claim 7, wherein the at least one additional fluid dispensing mechanism is selected from the group consisting of an ink jet, a stream jet, a spray jet, a positive displacement dispensing mechanism, and a blown microfiber mechanism.

17. The fluid applicator of claim 1, wherein the first fluid dispensing mechanism is an ink jet mechanism.

18. The fluid applicator of claim 1, wherein the fluid dispensing system further comprises first and second fluid handling systems for storing and providing the first and second fluid materials to the first and second fluid dispensing mechanisms, respectively, in a suitable manner.

19. The fluid applicator of claim 18, wherein the first and second fluid handling systems include at least one of the abilities to heat, cool, positively pressurize and negatively pressurize the first and second fluid materials, respectively.

20. The fluid applicator of claim 1, wherein the substrate handling system includes a substrate handling device upon which the substrate is secured during fluid dispensing.

21. The fluid applicator of claim 20, wherein the substrate handling device comprises a rotatable drum.

22. The fluid applicator of claim 20, wherein the substrate handling device comprises a translatable platen.

23. The fluid applicator of claim 22, wherein the translatable platen is bi-directionally indexable.

24. The fluid applicator of claim 20, wherein the substrate handling device includes a vacuum for use in securing the substrate.

25. The fluid applicator of claim 20, wherein the substrate handling device has a variable temperature for at least one of heating and cooling the device.

26. The fluid applicator of claim 20, wherein the substrate conforms to the substrate handling device.

27. The fluid applicator of claim 1, wherein the substrate comprises a web.

28. The fluid applicator of claim 1, wherein the substrate comprises a sheet.

29. The fluid applicator of claim 1, further comprising a processing system that processes the dispensed first and second fluid materials on the substrate.

30. The fluid applicator of claim 29, wherein the processing system includes at least one component chosen from the group consisting of curing systems, drying systems, ventilation systems and converting systems.

31. The fluid applicator of claim 30, wherein the processing system comprises a radiation curing device.

32. The fluid applicator of claim 31, wherein the radiation curing device comprises an ultraviolet radiation curing component.

33. The fluid applicator of claim 1, wherein the control system comprises a digital control system.

34. The fluid applicator of claim 1, wherein the control system determines positioning of the substrate and first and second fluid dispensing mechanisms and dispensing of the first and second fluid materials based on a digital image.

35. The fluid applicator of claim 34, wherein the control system produces the digital image.

36. The fluid applicator of claim 34, wherein the control system receives the digital image.

37. A fluid applicator capable of both high resolution and high throughput fluid deposition comprising:
a fluid dispensing system that dispenses fluid material, the fluid dispensing system including a first fluid dispensing mechanism that dispenses a first fluid material at a first resolution and a first throughput, and a second fluid dispensing mechanism that dispenses a second fluid material at a second resolution and a second throughput that are different from the first resolution and the first throughput, respectively, with at least one of the first and second fluid materials including an adhesive;
a substrate handling system that positions a substrate with respect to the fluid dispensing system; and
a control system that controls dispensing of the first and second fluid materials onto the substrate in a predetermined pattern while positioning the substrate and the first and second fluid dispensing mechanisms with respect to each other.

38. A method of dispensing a fluid material at both high resolution and high throughput levels, the method comprising the steps of:
providing a first fluid dispensing mechanism that dispenses fluid at a first resolution and a first throughput using a first fluid dispensing technology, and a second fluid dispensing mechanism that dispenses fluid at a second resolution and a second throughput that are different from the first resolution and first throughput, respectively, using a second fluid dispensing technology that is different from the first fluid dispensing technology;
providing first and second fluid materials to be dispensed by the first and second fluid dispensing mechanisms, respectively;
providing a substrate onto which the first and second fluid materials are to be dispensed; and
dispensing the first and second fluid materials onto the substrate in a predetermined pattern by contemporaneous activation of the first and second fluid dispensing mechanisms when positioned with respect to the substrate in a desired location.

39. The method of claim 38, further comprising the step of registering the substrate with respect to the first and second fluid dispensing mechanisms.

40. The method of claim 39, wherein the substrate includes a previous pattern and the method further comprises the step of registering the previous pattern with respect to the first and second fluid dispensing mechanisms.

41. The method of claim 38, further comprising the step of processing the dispensed first and second fluid materials on the substrate.

42. The method of claim 41, wherein the step of processing the first and second fluid materials includes at least one process chosen from the group consisting of curing, drying, ventilating and converting.

43. The method of claim 38, further comprising the step of processing an image to produce the predetermined pattern in which the first and second fluid materials are to be dispensed.

44. The method of claim 43, wherein the image comprises a digital image, and the method further comprises the step of receiving the digital image from a digital source.

45. The method of claim 43, wherein the image comprises a digital image, and the method further comprises the step of creating the digital image from a non-digital source.

46. The method of claim 38, wherein the step of dispensing further comprises moving the first and second fluid dispensing mechanisms with respect to the substrate while activating the first and second fluid dispensing mechanisms to deposit the first and second fluid materials in the predetermined pattern.

47. The method of claim 38, wherein the step of dispensing further comprises moving the substrate with respect to the first and second fluid dispensing mechanisms while activating the first and second fluid dispensing mechanisms to deposit the first and second fluid materials in the predetermined pattern.

48. The method of claim 38, further comprising the step of providing at least one additional fluid dispensing mechanism that dispenses a fluid material at a resolution and throughput using a fluid dispensing technology.

49. A method of forming an article from a substrate and fluid material comprising the steps of:
providing a first fluid dispensing mechanism that dispenses a first fluid material at a first resolution and a first throughput using a first fluid dispensing technology, and a second fluid dispensing mechanism that dispenses a second fluid material at a second resolution and a second throughput that are different from the first resolution and first throughput, respectively, using a second fluid dispensing technology that is different from the first fluid dispensing technology;
providing first and second fluid materials;
providing a substrate onto which the first and second fluid materials are to be dispensed;
dispensing the first and second fluid materials onto the substrate in a predetermined pattern by contemporaneous activation of the first and second fluid dispensing mechanisms when positioned with respect to the substrate in a desired location; and
processing the first fluid material, second fluid material and substrate combination to produce an article.

* * * * *